Patented Apr. 17, 1945

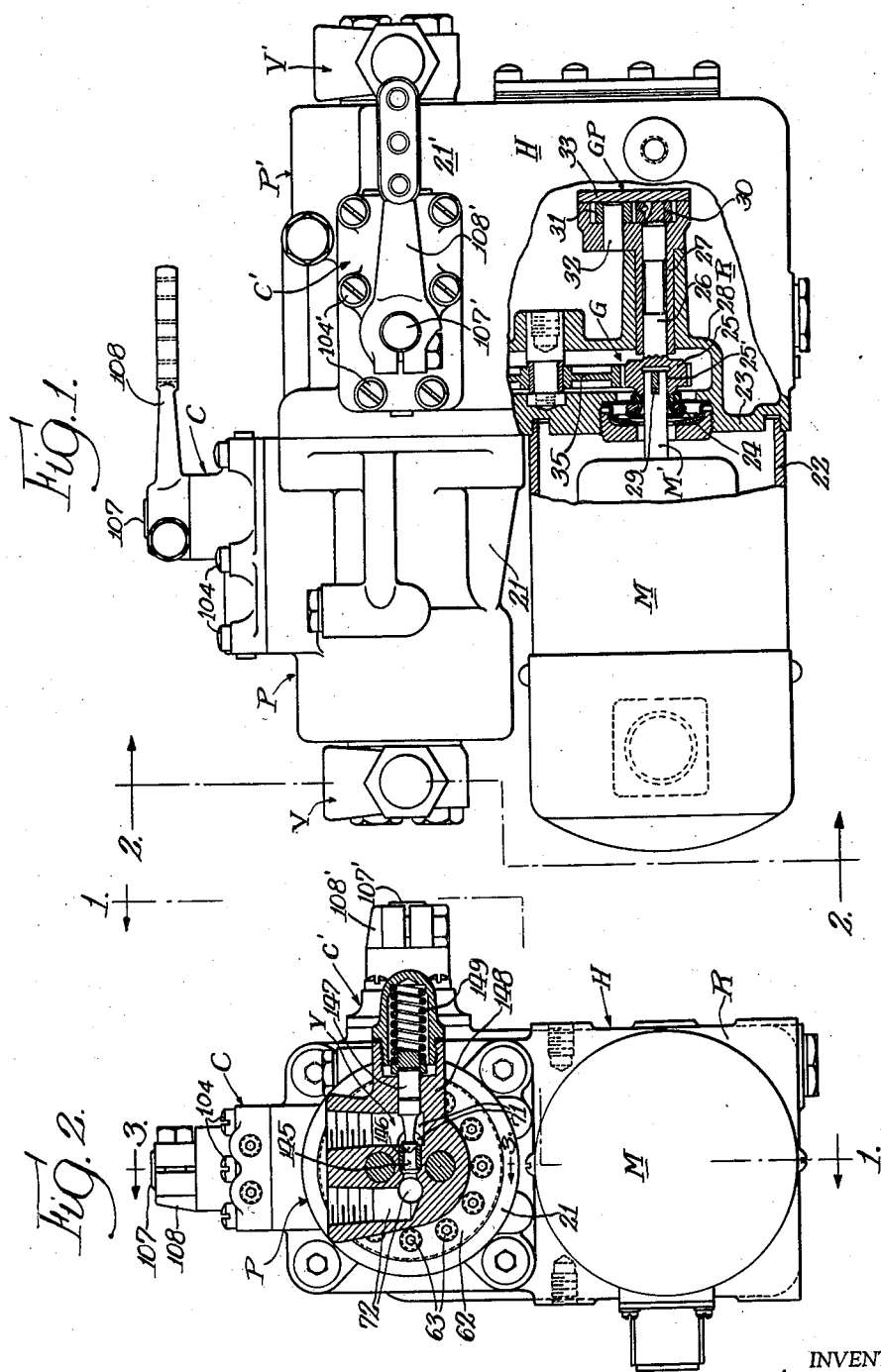

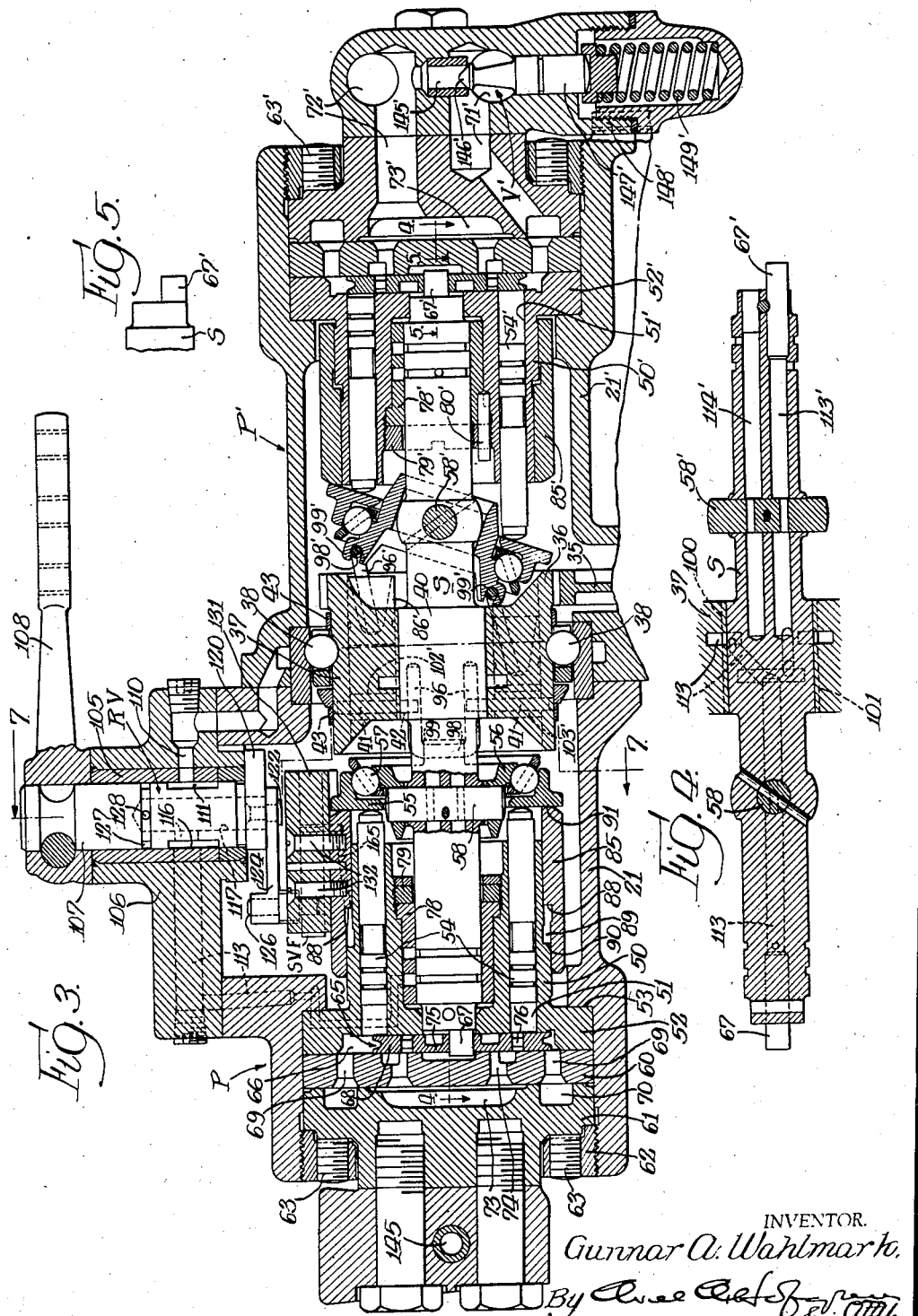

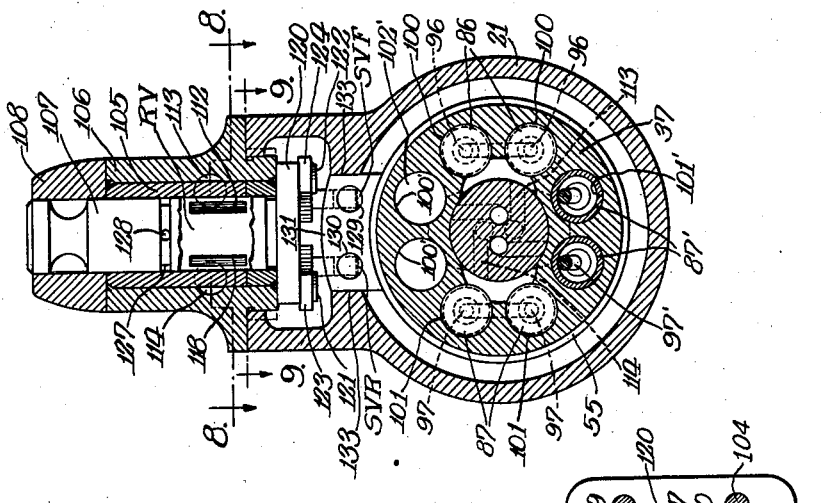

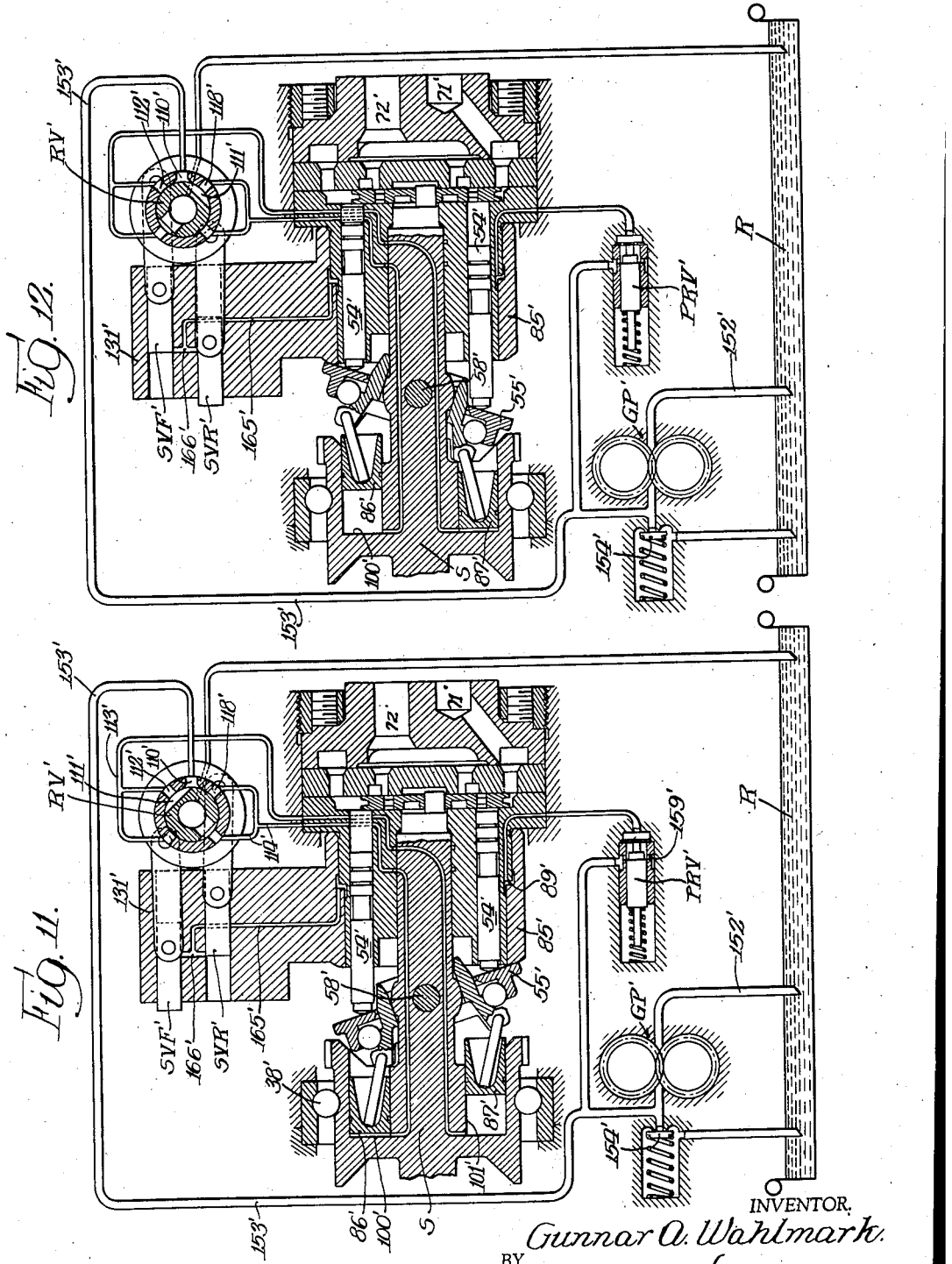

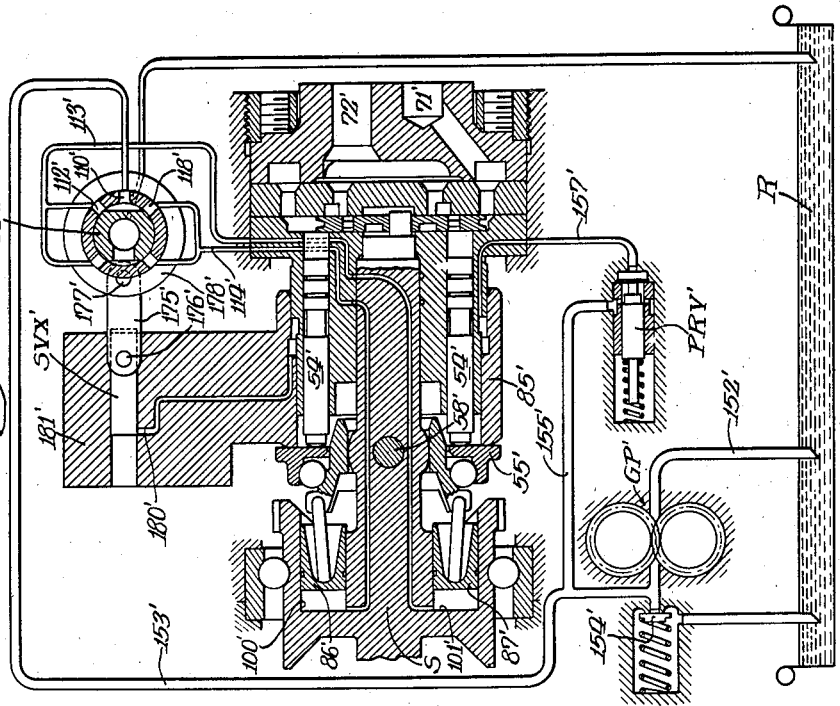

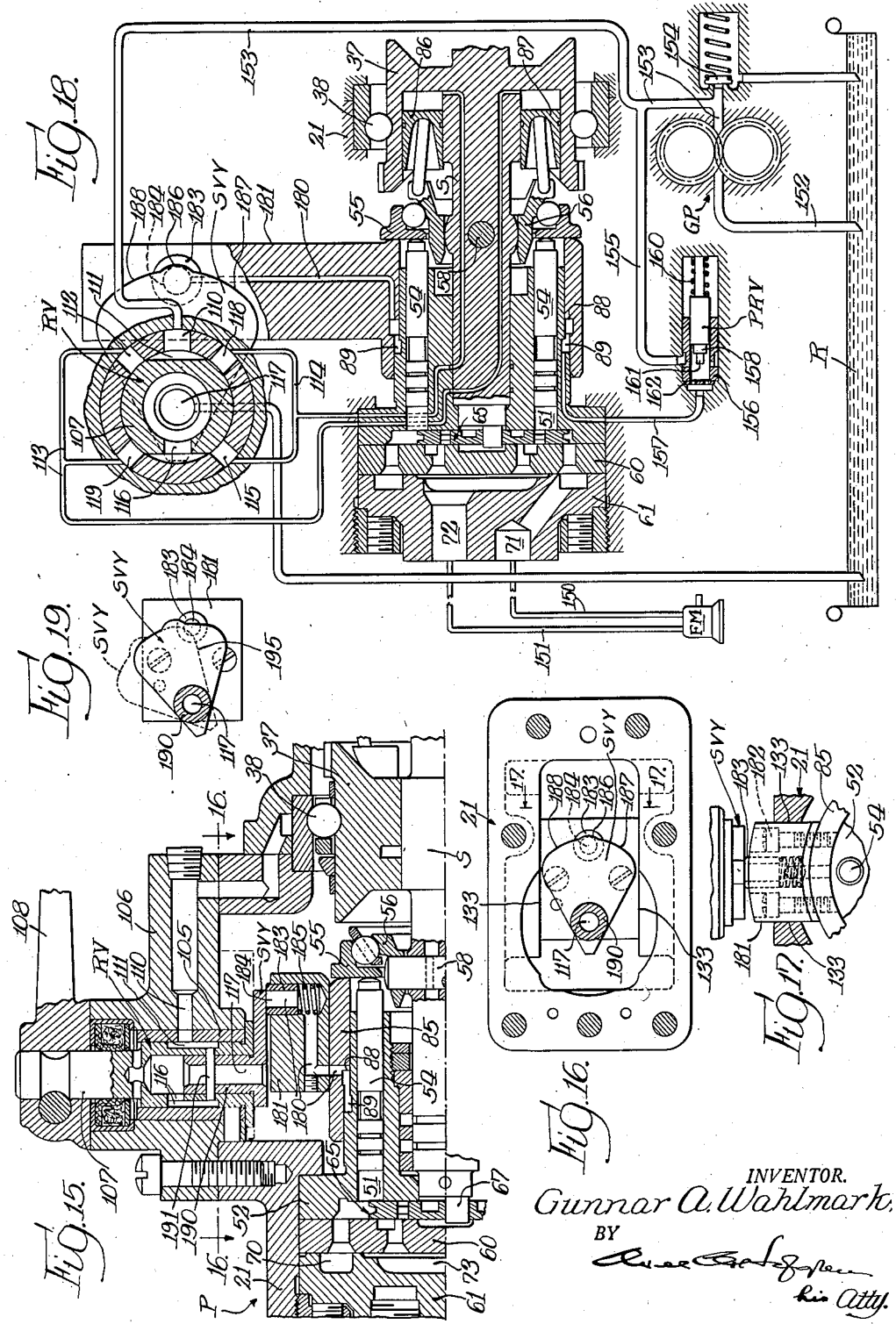

2,373,724

UNITED STATES PATENT OFFICE 2,373,724

HYDRAULICALLY OPERATED CONTROL MECHANISM

Gunnar A. Wahlmark, Rockford, Ill.

Application August 1, 1942, Serial No. 453,207

19 Claims. (Cl. 121—41)

It is the general object of the invention to provide a new and improved hydraulically operated control mechanism of the servo type. More particularly it is an object to provide a new and improved hydraulically operated control mechanism for adjusting the stroke of the pistons of piston type pumps and motors. This application is a continuation in part of my copending application Serial No. 432,917, filed March 2, 1942.

Another object is to provide a reversible wobbler type mechanism with a new and improved control means for adjusting the stroke of the pistons, and the position of the wobbler on both sides of neutral as well as to its neutral or no-stroke position.

Another object is to provide a new and improved servo type control operable in combination with a reversing valve to accomplish such result.

It is another object to provide such a mechanism with a unitary wobbler reversing and stroke adjusting control of the servo type, and more particularly to provide a unitary control of this kind of extremely small size, light weight and high sensitivity.

Another object is to provide a servo control mechanism embodying a rotary valve member having an edge operable as a valve, the invention contemplating modification of the contour of the edge of the valve member to vary the operating characteristics of the mechanism.

A further object is to provide a new and improved fluid actuated stroke control means for piston type pumps and motors, including mechanism for changing the stroke of the pistons, and which lends itself to modification to vary the time required to change the stroke.

Other objects will become readily apparent from the following description, taken in connection with the accompanying drawings, in which:

Fig. 1 is a front elevational view, partly in section along the line 1—1 of Fig. 2, of a preferred form of my invention.

Fig. 2 is an end view, partly in section, along the line 2—2 of Fig. 1.

Fig. 3 is a fragmentary central longitudinal section along the line 3—3 of Fig. 2, with certain parts at the right hand end turned 90° about the shaft axis.

Fig. 4 is a fragmentary section along the line 4—4 of Fig. 3.

Fig. 5 is a fragmentary view along the line 5—5 of Fig. 3.

Fig. 6 is a top plan view of the preferred form of the invention.

Fig. 7 is a vertical section along the line 7—7 of Fig. 3.

Fig. 8 is a horizontal section along the line 8—8 of Fig. 7.

Fig. 9 is a horizontal section along the line 9—9 of Fig. 7.

Fig. 11 is a similar circuit diagram with the servo control valves and wobbler adjusted to their maximum stroke positions for fluid discharge from the pump in one direction.

Fig. 12 is a similar circuit diagram with the servo control valves and wobbler adjusted to their maximum stroke positions for fluid discharge from the pump in the opposite direction.

Fig. 13 is a similar circuit diagram with the servo control valves moved to their neutral position, the wobbler still remaining in the maximum stroke position of Fig. 11.

Fig. 14 is a similar circuit diagram, with the pump wobbler in its no-stroke position and a modified form of servo control adjusted to its neutral or no-stroke position.

Fig. 15 is a fragmentary sectional view along line 3—3 of Fig. 2 showing a second modified form of servo control.

Fig. 16 is a section along line 16—16 of Fig. 15.

Fig. 17 is a fragmentary view along line 17—17 of Fig. 16.

Fig. 18 is a circuit diagram, with the pump wobbler in its no-stroke position, of the modified form of servo control of Figs. 15 to 17.

Fig. 19 is a fragmentary view of some of the parts shown in Fig. 16 and with the servo valve in two different positions of adjustment.

Figure 10:
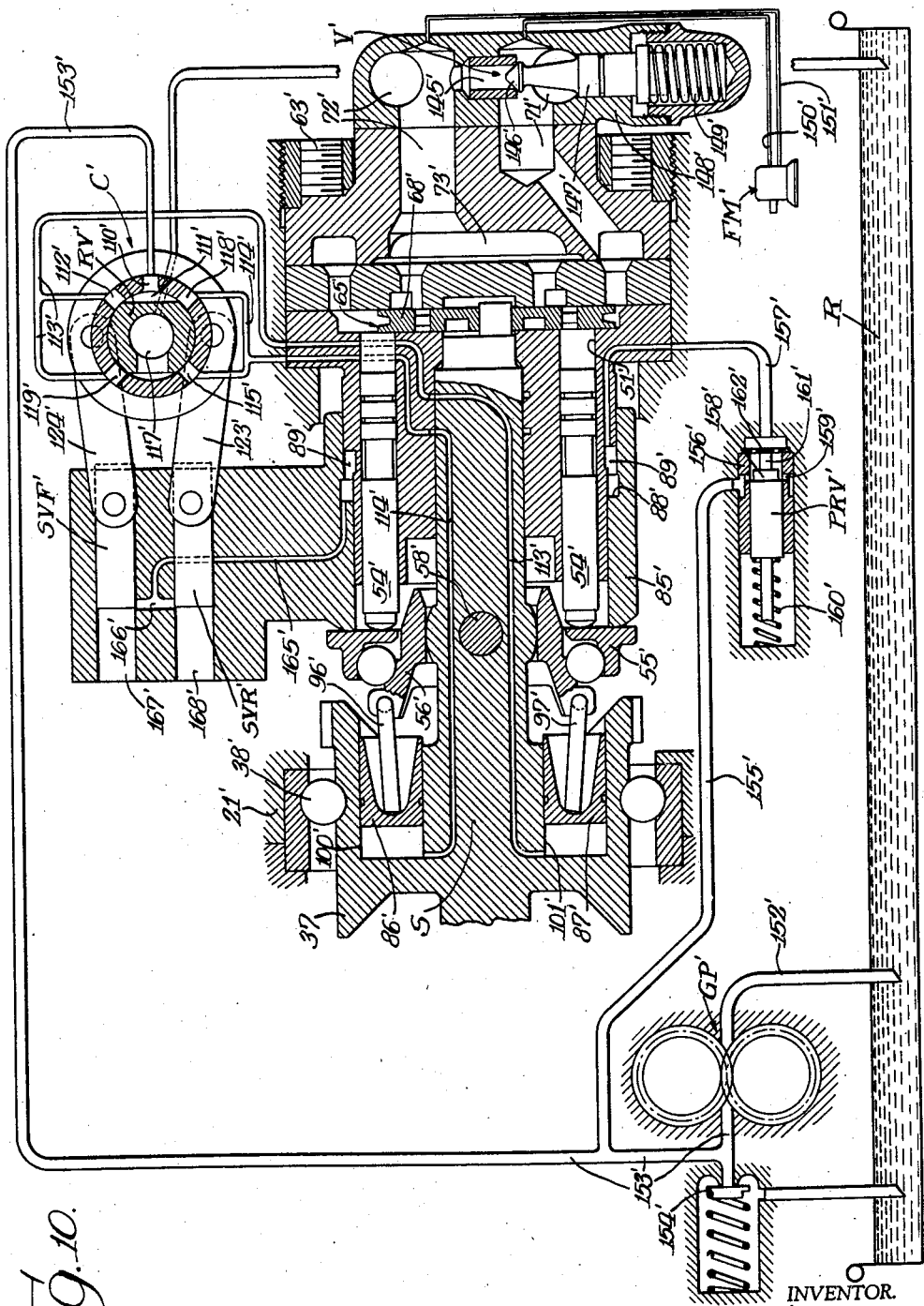
Fig. 10 is a diagrammatic representation of the hydraulic circuit for one piston pump device with its servo control valves and the wobbler adjusted to their neutral or no-stroke position.

There is illustrated in the drawings and hereinafter described in detail, a preferred form of the invention, together with a modification thereof, with the understanding that the disclosure is intended as an exemplification of the principles of the invention and is not intended to limit the invention to the forms shown. The scope of the invention will be pointed out in the appended claims.

In the form selected for purposes of disclosure and as illustrated in Figs. 1 to 13, the invention comprises generally a three-quarter horsepower 6000 R. P. M. direct current motor M, two twelve cylinder wobbler type piston pumps P and P' with self contained servo controls C and C', respectively, a gear type pump GP for furnishing a fluid (such as oil) for control and make-up purposes, reduction gearing G connecting the motor shaft M' to a pump shaft S (which is common to both of the pumps P and P'), high pressure safety valves V and V' for the pumps P and P', respectively, and a casing or housing H which encloses and connects certain of the parts to provide a unitary structure. It is contemplated that the inlet and outlet ports for each pump will be connected by means of suitable conduits to a fluid motor (indicated at FM' in Fig. 10) which may be a rotary motor, a single piston and cylinder device or of any other desirable form.

More particularly, as illustrated in Figs. 1 to 9, the housing H has a lower portion forming a reservoir R for oil or other suitable fluid, and an upper portion 21' forming a casing for the pump P'. A casing 22, for the motor M, is suitably secured to the left hand end (Fig. 1) of the lower portion of the housing H. The motor shaft M' extends through an opening in the adjacent housing wall 23, through a mechanical seal 24 (which is shown as of the type disclosed and claimed in my Patent No. 2,216,218, dated October 1, 1940) and into a bore 25' in a pinion 25. This pinion is formed integrally with a shaft 26 which is supported in a bushing 27 carried in a bracket-like extension 28 on the housing wall 23. The fit of the motor shaft M' in the bore 25' is such that the end of the motor shaft is supported in the pinion. A driving connection is provided by a cross key 29 which extends through a diametrical slot in the shaft M' and into registering longitudinal slots (not shown) in the pinion 25.

The gear pump GP (Fig. 1) comprises a pinion 30 pinned on the end of shaft 26 and a meshing pinion 31, rotatably mounted on a pin 32. A chamber for the gears is formed by a recess in an extension 34 on the bushing 27, and a suitable cover plate 33.

The gearing G (Figs. 1 and 3) for driving the pumps P and P' includes the drive pinion 25, an idler gear 35, and a gear 36 (Fig. 3) formed integrally with a cylindrical pump drive member 37 which is rotatably mounted in the upper portion of the housing H by means of a ball bearing 38.

As illustrated herein the pumps P and P' (and their associated servo controls C and C') are substantially alike in construction and operation, so that a detailed description of pump P will suffice. The corresponding parts of pump P' will be given the same numerals with a "prime" added thereto.

The shaft S for the pumps extends in opposite directions from the drive member 37 (Fig. 3) and has a central enlarged portion 40 which is fitted into a central bore in the member 37. A plurality of pins 41 extend radially inward through bores in the drive member 37 and into registering sockets 42 in the shaft S to form a driving connection therebetween, a pair of bands 43 being provided to hold the pins 41 in their bores and sockets.

The pumps, as mentioned hereinbefore, are of the wobbler type and have twelve cylinders each. Preferably they are of the type disclosed and claimed in my Patent No. 2,280,875, dated April 28, 1942. As illustrated, the pump P comprises a casing 21, generally cylindrical in form as shown best in Fig. 7, and secured at one end to the casing 21' of the pump P'. A cylinder block 50 has twelve cylinder bores 51 therein, and has an external flange 52 positioned against an annular shoulder 53 within the casing 21. Pistons 54 are reciprocably mounted in the cylinders 51 and extend therefrom and into engagement with an outer member 55 of a wobbler device. An inner annular member 56 is connected to the outer member 55 by a ball bearing 57, and is pivotally mounted on the drive shaft S by means of a pin 58. The wobbler plate is thus adjustable angularly about the pin 58 from the neutral or no-stroke position shown in Figs. 3 and 10 toward the full stroke positions shown in Figs. 11 and 12 for wobble plate 55'.

A disk-like member or valve plate 60 is positioned in the pump casing against the flanged end of the cylinder block, and a cap member 61 is positioned against the outer surface of the valve plate 60. The cylinder block, valve plate and cap member are effectively clamped in place in the casing by a ring 62 which has external screw threads engaging corresponding threads on the casing 21, and plurality of screw devices 63, herein twelve in number, which are threaded through the ring 62 and against the cap member 61 to tighten the parts in place. This type of clamping means for the ports has the advantage of the full tensile strength of the casing as distinguished from prior constructions wherein bolts under tension were used, the screws 63 herein being under compression.

The flow of fluid to and from the pump cylinders 51 is controlled by means of a wheel-like valve 65, which is positioned in a cylindrical valve chamber 66 formed in the cylinder block 50, and is driven by the shaft S through an eccentric pin 67 thereon so as to have a gyratory motion. This type of valve is disclosed and claimed in my Patent No. 2,190,812, dated February 20, 1940. Briefly, it includes a rim 68 which covers and uncovers the adjacent ends of the cylinders 51 and alternately connects them to the valve chamber 66 outwardly of the rim 68 and inwardly of the rim. The outer portion of the valve chamber connects through an annular series of ports 69 (in the valve plate 60) with an annular port 70 in the cap member 61, this annular port communicating in turn with a first pump port 71 (Fig. 2). A second pump port 72 connects with a recess 73 (Fig. 3) in the cap member 61, and through a plurality of ports 74 in the valve plate communicates with the gyratory valve 65 inwardly of the rim 68. Since the rim of the valve is connected to its hub 75 by spokes 76 communication is established periodically between the ports 74 and the cylinders 51.

When the invention is used for pumping fluid at relatively high pressures, the valve 65 is preferably made relatively thin, as shown. The peripheral portion of the valve plate 60, and the portion just inwardly of the ports 69 are backed up rigidly by the cap member 61 as is evident from Fig. 3. To reinforce the center of the valve plate when the ports 74 are pressure or outlet ports, the chamber 73 is arranged so that the fluid under high pressure can act against the adjacent central portion of the valve plate and keep it in efficient sealing contact with the valve 65.

As illustrated herein, the shaft S is supported at its ends by bushings 78 and 78' which are mounted in the cylinder blocks 50 and 50' and have outwardly extending flanges which are clamped against shoulders in the cylinder blocks by means of threaded rings 79 and 79'. Preferably the bushings and rings are then secured against rotation in the cylinder blocks by pins as indicated at 80'.

With the exemplary form of the invention it is contemplated that the pump shaft S will be driven continuously by the motor M and that the output of the pumps P and P' and the direction of flow of the fluid therefrom, will be controlled by adjustment of the wobble plates of the pumps from neutral to forward and reverse positions. The means for adjusting the wobble plates will now be described.

As illustrated in the drawings the adjusting means for each pump comprises a control sleeve 85 (Fig. 3), control pistons 86 and 87 (Figs. 3 and 7) and means including the servo control C for controlling the fluid acting on the control sleeve and control pistons. The control sleeve 85 is slidably supported on the cylinder block 50 and is provided with an internal annular shoulder 88 which functions as a piston. An annular chamber 89 surrounds the cylinder block between the shoulder piston 88 and an opposed shoulder 90 on the block 50. As more fully described hereinafter, the chamber 89 is supplied with fluid from the gear pump GP to move the control sleeve towards the wobbler of the associated pump and thereby determine the angular position of the wobbler. In Fig. 3, the control sleeve has moved the wobbler 55, 56 to a neutral or no-stroke position wherein the right hand end 91 of the control sleeve engages the outer member 55 of the wobbler throughout its periphery and holds it in exact neutral.

The control pistons 86 and 87 (Fig. 7) are herein arranged in pairs, the pistons 86 operating through piston rods 96 (Figs. 3 and 7) to move the wobbler in one direction from its neutral position (against the action of fluid on the control sleeve piston 88), and the pistons 87 operating through piston rods 97 to move the wobbler in an opposite direction from neutral. Each pair of piston rods 96 are formed as the legs of a U shaped member, the bight 98 of which is pivoted in a lug 99 formed integrally with the inner wobbler member 56. Cylinders 100 for the pistons 86 and cylinders 101 for the pistons 87 are bored through the drive member 37 and are then closed at one end by means of plugs 102 and 103, respectively, the plugs being held in place by the pins 41. The control pistons 86 and 87 may properly be referred to as "forward" and "reverse" pistons since their function, primarily, is to reverse the direction of fluid flow through the pump P. It is believed readily apparent that the control sleeve 85 acts to determine the stroke of the pump pistons regardless of the direction of fluid flow through the pump. This characteristic of the control sleeve is utilized in a unique manner in connection with the servo control C, the construction and operation of which will now be described.

The servo control designated generally by the letter C is associated with the pump P and includes a cylindrical reversing valve RV and a pair of servo valves SVF and SVR (Figs. 3, 7 and 9). The reversing valve RV is rotatably mounted in a bushing or casing 105 supported in a vertical position in a plate 106 secured to the top of the pump casing 21 by screws 104. This valve is herein provided with a stem 107 for the attachment of an operating arm 108 and is adapted to be rotated out of the neutral position of Figs. 1 to 3 and 6 to 10 to the forward and reverse positions of Figs. 11 and 12, respectively. As shown most clearly in Figs. 3, 7 and 8, control fluid under pressure supplied through a port 110 in the casing 105 enters a chamber 111 in the casing formed by a cutaway portion on the valve RV. By rotating the valve counterclockwise (Fig. 8) this fluid can be directed out through a valve port 112 to a passage 113 which leads ultimately to the control cylinders 100. When in this position, fluid from the control cylinders 101 is exhausted through a passage or port 114, through a port 115 in the casing 105, a port 116 in the valve RV and an axial passage 117 in the valve which discharges at its lower end into the casing 21 of the pump P. Rotation of the valve RV in a clockwise direction from the position of Fig. 8 directs control fluid through a port 118 in casing 105 into port 114 and on to control cylinders 101 while at the same time fluid from the control cylinders 100 exhausts through a passage 113, a port 119 in casing 105, valve port 116 and passage 117. A leakage groove 127 surrounds the valve RV and is connected to the return passage 117 by a port 128.

The servo valves SVF and SVR are connected to the reversing valve RV so as to be operated simultaneously therewith, the valve SVF functioning when the reversing valve is moved in one direction from neutral to a "forward" position (Fig. 11) and valve SVR functioning when the valve RV has been moved to its "reverse" position as in Fig. 12. As shown in Figs. 3, 7 and 9, the valve RV is formed with a flange 120 on its lower end and carries diametrically opposite, downwardly extending pins 121 and 122 to which links 123 and 124 are anchored. The other ends of these links are connected by pins 125 and 126, to the valves SVR and SVF respectively. The servo valves are cylindrical in form and slide in parallel bores 129 and 130 in a block or casing 131 which is mounted fixedly on the control sleeve 85 and is secured thereto by screw devices 132 so that the casing for the servo valves moves with the control sleeve 85 whose movement the servo valves control. As shown in Figs. 7 and 9 the block 131 is guided between parallel ways 133 formed on the pump casing 21, to prevent rotary movement of the sleeve 85.

Although a more complete disclosure of the fluid circuits for the pumps and controls will be found in the circuit diagrams of Figs. 10 to 13, some of the passages are illustrated in Figs. 3, 4, 7 and 8. In these figures the passage 113 includes (Fig. 3) connecting bores in the plate 106, connecting bores in the casing 21, connecting bores in the cylinder block 50, a port through bushing 78, an annular groove in the shaft S, a short radial port, a longitudinal bore (Fig. 4) and an oblique bore in the shaft, and a recess (Fig. 7) in the member 37 which connects the outer end of the oblique bore with the two control cylinders 100. A corresponding series of bores, ports and recesses form the passage 114.

The high pressure relief valves V and V' are alike so a description of valve V in connection with Fig. 2 will suffice. The pump ports 71 and 72 are connected by a by-pass port 145. A valve 146 is arranged to control the by-passing of fluid through this port and is operable in this capacity when port 71 is the outlet port of the pump and also when the port 72 is alternatively the outlet port. Valve 146 has a cylindrical portion 147 which is slidably mounted in a bore in the valve casing 148 and is engaged by a coiled spring 149 which serves to urge the valve 146 constantly towards its closed position as shown. The cylindrical portion 147 is made to have a cross sectional area approximately twice the cross sectional area of the port 145 where it forms a seat for the valve 146. When the port 72 is the pump outlet port the fluid discharged by the pump acts against the left hand end of valve 146, and when the pressure rises above the value for which the spring 149 is adjusted, valve 146 opens and by-passes fluid back to the port 71 which is then the inlet port for the pump. When the wobbler is reversed so that port 71 is the pump outlet port the fluid acts on the exposed surfaces of the valve 146 which are within the port 71. These surfaces include the exposed end of the cylindrical portion 147 and part of both sides of the valve 146. The parts are so proportioned that the areas acted upon by the fluid to urge the valve 146 to its open position exceed the area acted upon by the fluid to seat the valve by an amount equal to the cross sectional area of port 145.

Thus the valve 146 opens to by-pass fluid at the same pre-adjusted pressure for both directions of pump discharge.

Reference is now made more particularly to Figs. 10 to 13. In these figures there is illustrated the hydraulic circuit for the pump P' and since the circuits for the two pumps are identical a description of one will suffice. In Fig. 10, the control C' and the pump P' are adjusted to their neutral or no-stroke position. The pump ports 71' and 72' are shown connected to a suitable fluid motor FM' by means of conduits 150' and 151'. Fluid from the reservoir R is conducted to the gear pump GP' by a conduit 152' and is conducted away from the gear pump by a conduit 153' which leads to the port 110' of the reversing valve RV'. A by-pass valve 154' is provided to maintain constant pressure in the conduit 153' and to permit excess fluid to pass back to the reservoir. A conduit 155' leads from the conduit 153' to the casing 156' of a pressure reducing valve PRV'. Fluid which passes the valve PRV' is conducted by a conduit 157' to the chamber 89' wherein it acts on the piston 88' formed on the control sleeve 85'. The valve PRV' has a reduced cylindrical portion 158', which normally lies opposite valve ports 159' in the casing 156' so as to restrict the passage of fluid over the valve. The valve is urged into this position by a spring 160', a stem 161' on the valve engaging a perforated disk 162' to limit the movement of the valve by the spring. The fluid in chamber 89' moves the control sleeve 85' towards the left (Fig. 10) to the no-stroke position shown since the pistons 86' and 87' are then inactive.

The pressure of the fluid in chamber 89' is herein controlled by the servo valves SVF' and SVR' by regulating the exhaust of fluid from said chamber through an exhaust passage 165'. This passage leads to a port 166' which communicates with bores 167' and 168' in which the valves SVF' and SVR' are slidable. Preferably the port 166' is so positioned that when the servo valves are in the positions shown in Fig. 10, there is a slight discharge of fluid into the bores 167' and 168', this fluid then returning to the reservoir R by gravity. The discharge under these conditions is small but it does effect the pressure in the chamber 89' to the extent that valve PRV' is in its restricted position of Fig. 10. With the exhaust passage 165' slightly open in neutral, then upon any movement of the valves SVF' and SVR' from neutral the exhaust of fluid from passage 165' increases instantaneously.

The reversing valve RV', when in the position shown in Fig. 10 opens slightly the ports 112' and 118' to the fluid supply in 111', thus supplying fluid in small quantities to the pistons 86' and 87' and equalizing the pressure thereon. Movement of the valve RV' in either direction from the position shown, further opens the ports 112', 115' or 118', 119'. Assuming the reversing valve is shifted to the "reverse" position of Fig. 11, fluid passes from the supply conduit 153', through port 110', port 112' and passage 113' to cylinders 101' to act on pistons 87'. Simultaneously the servo valve SVR' is pulled towards the right from the position shown in Fig. 10 so as to at first uncover the lower end of exhaust port 166' and thereby reduce the pressure in the annular control sleeve chamber 89', the exhaust of fluid through passage 165' then being greater than the fluid supplied through the ports 159' of the reducing valve PRV' due to the restriction caused by the port 158' of that valve. The pistons 87' then exert a force on the wobbler which overcomes the effect of the control sleeve piston 88' and the control sleeve is moved towards the right from the position of Fig. 10 towards the position of Fig. 11. Since the casing 131' for the servo valves is carried on and moves with the control sleeve 85', the casing 131' "follows" the servo valve SVR' to its right hand position (as in Fig. 11) and until the port 166' is again just slightly uncovered by the end of the servo valve and the exhaust of fluid through passage 165' is substantially stopped. The pressure in chamber 89' is then built up to the full value required to counterbalance the effect of the pistons 87'. Since the servo valve SVR' is mechanically coupled to the flange 120 of the valve RV' the position of the valve member SVR' is determined by the angle through which the valve RV' is shifted, and this position of the member SVR' will determine the extent of the movement of the casing 131' as it "follows" the servo valve SVR' just far enough to cause the port 166' to be covered by the end of the valve member SVR'. The control sleeve 85', being rigidly connected to the casing 131', is thus arrested at any selected position corresponding to the angle through which the valve RV' is shifted. The wobbler is thus adjusted to whatever position is selected for the servo valve SVR', which may be anywhere between neutral and maximum stroke. Thus the direction of movement of the valve RV' from neutral determines the direction of flow of the fluid from the pump GP' and the distance the valve RV' is moved from neutral determines the volumetric output of the pump.

In Fig. 12 the reversing valve RV' is shown in its "forward" position, the servo valve SVF' then functioning to determine the volumetric output of the pump and the pistons 86' acting to move the wobbler clockwise from its "no-strike" position to the position shown.

In Fig. 13 there is illustrated the positions of the parts and the condition of the circuit when the reversing valve RV' and the servo valves SVF' and SVR' are moved quickly from their "reverse" positions of Fig. 11 to their "neutral" or "no-strike" positions of Fig. 10 and before the control sleeve 85' has had time to move to "neutral" in response thereto. The exhaust port 166' is, therefore, entirely closed, preventing even the slight leakage which normally passes therethrough when the parts have reached equilibrium. This condition causes an increase in the pressure of the control fluid in chamber 89' and also in the right hand end of the casing 156' of the pressure reducing valve PRV' with the result that this valve is shifted to the left as shown in Fig. 13 and permits increased flow of fluid through the ports 159'. This causes a fast movement of the wobbler to its neutral position and provides for a rapid deceleration of the associated motor FM'. Since the ports 112' and 118' are both slightly open to the fluid in chamber 111', fluid can flow to the cylinders 100' and back from the cylinders 101' to permit the wobbler to return to its neutral position.

Fig. 14 illustrates a form of the invention embodying a modification of the servo control. In this form, a single servo valve SVX' is used. This valve is connected by a link 175' and pivot pins 176' and 177' to a flange 178' on the reversing valve RV'. The parts are arranged as shown so that with the wobbler and the reversing valve in their neutral positions, the link 175' is in a "dead center" position. Thus regardless of the direction of movement of the reversing valve from neutral, the servo valve SVX' moves towards the right and opens the exhaust or relief port 180'. If the reversing valve is moved in a clockwise direction from the position shown in Fig. 14, control fluid passes from the port 110' through port 118' and passage 114' to cylinders 100' and actuates the pistons 86' so that the wobble plate turns in a clockwise direction from the position of Fig. 14. Movement of the control sleeve 85' then causes the valve casing 181' of the servo valve SVX' also to move towards the right, following the servo valve to the new position thereof. Correspondingly, if the reversing valve RV' is moved in a counterclockwise direction from the position of Fig. 14, control fluid from the port 110' passes through port 112' and passage 113' to the cylinders 101' and actuates the pistons 87' towards the right, thus swinging the wobbler in a counterclockwise direction from the position shown. This also causes the control sleeve 85' to move towards the right and to "follow" the servo valve to its new position.

Preferably the plate 106 which supports the reversing valve RV and the associated servo valves SVF and SVR, is mounted so that it may be adjusted on the casing 21 longitudinally of the axis of the casing so as to permit of slight adjustment of the servo valves with respect to the exhaust port 166. One common way to obtain this adjustment is by enlarging or elongating the holes in 106 through which the clamping screws 104 pass (see Figs. 8 and 9) so that by loosening the screws the plate can be shifted to a slight extent.

It is to be understood that when the wobbler has been adjusted to a stroke producing position by the actuating pistons 86', for example (Fig. 12), the force of these pistons on the wobbler is counter-balanced by the force of the annular control sleeve piston 88' and the force which the pump pistons 54' exert against the wobbler during their discharge or exhaust strokes. When the load on the pump is heavy and the discharge pressure is relatively high, the force which must be exerted by the control sleeve piston 88 is substantially less than when the load on the pump is light and its discharge pressure is relatively low. The force exerted by the pistons 86' is constant when these pistons are operable. When the force exerted by the pump pistons 54' goes down the force exerted by the control sleeve piston 88 must go up, to maintain the pump stroke constant.

As illustrated in Figs. 1 to 14 the invention is embodied in forms designed to provide for a rapid or quick change from one pump stroke adjustment to another. This is accomplished in part by having the servo valves "cracked open" slightly when they are in their neutral positions and in part by providing relatively strong springs 160 and 160' for the pressure reducing valves PRV and PRV'.

A rapid change in pump stroke causes an equally rapid acceleration or deceleration of the motor FM to which pump is connected.

In cases where a slower acceleration or deceleration is desired, a slower change in pump output can be obtained by having the servo valves closed completely in neutral position and by providing relatively weaker springs 160 for the valves PRV. This result is obtained with the form of the invention illustrated in Figs. 15 to 19.

Figs. 15 to 19 illustrate another modified form of part of the invention, the remainder of which is like that shown in Figs. 1 to 13. As shown in connection with a pump P, the control sleeve 85 forms a member movably or slidably mounted on a support consisting of the cylinder block 50. A means for actuating the sleeve 85 is found in the piston formed by the annular shoulder 88 thereon, this piston being subject to the fluid in the chamber 89, the pressure or effect of which on the piston is governed by a servo valve SVY. As illustrated in Fig. 18, fluid from the pump GP is supplied to the chamber 89 through conduits 155 and 157. A fluid control port 180 communicates at one end with the chamber 89 and extends radially through the control sleeve 85, partly radially and partly longitudinally in a valve casing member or block 181 which is secured by screws 182 to and is carried by the sleeve 85, and then radially upwardly (Fig. 15) through a bushing 183 which is slidable, radially of the shaft S, in the casing member 181. The block 181 is guided, as shown in Fig. 7, between parallel shoulders 133 on the casing 21 and thereby holds the sleeve 85 against rotation. The upper or outlet end 184 of the port 180 is at the outer end of the bushing which extends beyond the adjacent surface of the casing member 181. The pressure of the fluid in the chamber 89 is governed, in this form of the invention also, by controlling the discharge of fluid therefrom through the port 180 while the pressure and quantity of the fluid supplied to the chamber 89 from the pump GP is governed by valves 154 and PRV.

A valve SVY is herein provided for controlling the valve port 184. This valve is somewhat in the form of a flat disk carried on and rotatable with the stem 107 of the reversing valve RV. Herein, a hollow hub 190 on the valve SVY extends into a bore in the valve stem 107 and is secured thereto by a pin 191. The under surface of the valve, as shown in Fig. 15, is flat and rides over the upper end of the bushing 183 which is urged into sealing contact with the valve by a coiled spring 185. The peripheral edge of the valve has a contour which is non-circular in form so that by rotating valve SVY the port 184 may be opened or closed. As illustrated, the valve has a neutral position as shown in Figs. 16 and 18 in which a mid-peripheral portion 186 of the valve closes the port 184. The edge portions 187 and 188 of the valve on each side of the mid-portion recede inwardly from a circle centered on the axis of the valve stem 107 so that by rotating the valve SVY in either direction from its neutral position the valve port 184 is uncovered to permit discharge of fluid therefrom. This permits of movement of the control sleeve towards the left (Figs. 15 and 18) under the influence of the pistons 86 or 87 until the sleeve 85 has carried the casing member to the left far enough so as again to close the valve port 184. The valve usually, but not necessarily, is symmetrical with respect to a line passing through the axis of the valve and the mid-peripheral portion 186.

By varying the contour of the valve portions 187 and 188 it is possible to vary the amount which the stroke of the pistons of pump P is changed for a given angular movement of the valve, and this in turn varies the speed at which a fluid motor FM, coupled to the pump, is operated.

In Fig. 19, the valve SVY is shown in full lines in a partly opened position to which it has been moved, and before the casing member has had time to assume its corresponding position to close the valve port 184 again. The valve port 184 is thus shown partly open, to permit discharge of fluid therefrom and thereby lower the pressure of the fluid in chamber 89 so as to enable the wobbler actuating pistons 87 to move the wobbler to a new position. There is also shown in dotted lines, the position of the valve SVY when moved quickly to its full stroke position and before the casing 180 has followed to its new position. The port 184 is then substantially wide open. This causes a marked drop in the pressure in chamber 89 which in turn permits the valve PRV to move to its fluid restricting position, thus reducing the supply of fluid to chamber 89 and permitting rapid movement of the wobbler to its full stroke position. As the sleeve 85 moves towards the left and carries the casing member 181 with it (Figs. 15, 16 and 19) the valve port 184 is closed by the side portion 195 of the servo valve SVY since (looking at Fig. 19) the casing member 181 moves towards the left while the servo valve remains in the dotted line position.

In Fig. 18 the parts are shown in the positions assumed when the reversing valve RV and the wobbler 55, 56 are in their neutral position. The valve PRV is shown with a spring 160 of such strength that under this condition of pump operation the valve is in its wide open position. Since the valve port 184 is closed, the valve PRV (and also the annular piston 88 on the control sleeve 85) is subjected to the full pressure of the gear pump GP as determined by the by-pass valve 154. Upon movement of the reversing valve RV to a position corresponding to the full line position of the servo valve SVY in Fig. 19, the valve port 184 is opened and the pressure in chamber 89 is reduced, thus enabling the wobbler actuating pistons 87 to tilt the wobbler to its new position clockwise (Fig. 18) from the position shown. The new position of the wobbler is one wherein the valve port 184, moving with the control sleeve 85, is again closed or almost closed by the servo valve SVY. In practice the valve port 184 is actually left slightly open when the wobbler is in positions other than neutral. This slightly or so-called "cracked" open condition of the servo valve when out of its neutral position permits a continuous outlet of fluid from the chamber 89 and thereby relieves the pressure therein to an extent which varies with the load on the pump.

When the load on the pump P is heavy (i. e., the fluid in the cylinder bores 51 is under high pressure during the discharge stroke of the pistons) the force of the wobbler adjusting pistons 87 (or 86) tending to tilt the wobbler to a longer stroke position is largely overcome by the pump fluid acting against the ends of the pump pistons 54, so that the pressure in the chamber 89 acting on the control sleeve piston 88 can be relatively low to make up the force necessary to counterbalance the force of the pistons 87. Under this condition the valve PRV is in its restricted position. If the load on the pump P is reduced so that the discharge pressure in the cylinder bores 51 drops, the force of the pump pistons 54 drops, in counteracting the force of the wobbler adjusting pistons 87, with the result that the control sleeve 85 shifts slightly in a stroke increasing direction. This movement of the control sleeve carries with it the valve port 184 and further closes that port. The pressure of the fluid in chamber 89 then rises and the valve PRV shifts towards its wide open position because of the rise in pressure of the fluid acting on the annular piston 88.

The operation of the various forms of the invention is believed readily understood. With the motor M in operation, the pump GP, as well as the shaft S for the pumps P and P', is driven. In the forms shown the valves 154 may be set to maintain a pressure such as 100 pounds per square inch in the conduits 153 and 155, it being understood that although the operation of the pump P is independent of the pump P', a single pump GP supplies the control fluid for both piston pumps. With the form shown in Figs. 1 to 14 the valves PRV may be provided with springs operable to permit the valves to move to their open position when the pressure of the fluid in chamber 89 is about 80 per cent of the fluid pressure in conduit 155. In these forms of the invention the servo valves are slightly open when in their neutral position and with the wobblers in neutral. In all forms of the invention there is a small opening of the reversing valves when in neutral, to supply fluid to ports 112 and 118 and to equalize the pressure on the pistons 86 and 87.

In the form of the invention of Figs. 15 to 19, wherein the servo valve closes the port 184 when in its neutral position the spring 160 for the valve PRV is preferably weaker than in the other forms, and may be selected to permit the valve to open when the pressure of the fluid in chamber 89 is 30, 40, 50, 60 (or some other) per cent of the pressure of the fluid in conduit 155. The strength of the springs for the valves PRV is selected to provide the desired speed in effecting changes in pump stroke.

Upon moving a servo valve from its neutral position in Fig. 18, this form of the invention functions in a manner similar to that hereinbefore described in connection with Figs. 10 to 13.

A distinct advantage of the invention as illustrated in Figs. 15 to 19 is in the form of the servo valve embodied in it. By changing the form or contour of this valve it is possible to vary the amount the stroke of the pump pistons is adjusted for a given angular movement of the servo valve. The valve is in effect two valves in that one edge of the valve functions in "forward" and the other in "reverse" positions thereof. The contour of the "forward" valve portion could readily be different from the "reverse" valve portion. The servo valves together with the automatic control of the pressure of the fluid by the PRV valves and the ease with which the valves may be modified in design provide a highly advantageous and simple servo control mechanism.

I claim:

1. A fluid operated servo control mechanism for a movably mounted element having, in combination, reversing means for moving said element in opposite directions from a neutral position, a member movable in one direction from a neutral position and operable to control the position of said element on both sides of its neutral position, means forming a control piston operable to move said member toward its neutral position, means for supplying fluid under pressure continuously to said piston to move said member toward its neutral position, mechanism for controlling the pressure of the fluid acting on the control piston comprising a pair of servo valves and a casing for the servo valves movable with said member, a reversing valve for controlling said reversing means, and means connecting the servo valves to the reversing valve so that one servo valve operates for each direction of movement of said element.

2. A fluid operated servo control mechanism for a movably mounted element having, in combination, means for moving said element in opposite directions from a neutral position, a member movable in one direction from a neutral position and operable to control the position of said element on both sides of its neutral position, means forming a piston operable to move said member toward its neutral position, means for supplying limited quantities of fluid under pressure continuously to said piston to move said member toward its neutral position, mechanism for controlling the exhaust of the fluid acting on the control piston comprising a pair of servo valves and a casing for a servo valve controlled port movable with said member, and a reversing valve for controlling said first mentioned means.

3. A fluid operated servo control mechanism for an element movable from a neutral position to selectable forward and reverse positions, having, in combination, fluid operated means for moving said element out of its neutral position to forward and reverse positions, a fluid operated device opposing the movement of said element from its neutral position and effective to determine the position of the element, means for supplying fluid under pressure to said fluid operated means and said device, a reversing valve movable in opposite directions from a neutral position for controlling the fluid supplied to said fluid operated means, means for controlling the fluid acting on said device comprising a pair of servo valves, a casing for said valves movable with said device, a fluid supply passage to said device, and a relief passage in said casing for fluid acting on said device controlled by said servo valves, and a pressure operable valve for restricting the flow of fluid through said supply passage when said relief passage is open, and operable when the relief passage is closed to increase the pressure of the fluid on said device.

4. A fluid operated servo control mechanism for an element movable from a neutral position to selectable forward and revers positions, having, in combination, fluid operated means for moving said element out of its neutral position, a fluid operated device opposing the movement of the element from its neutral position, means for supplying fluid under pressure to said fluid operated means and said device, a reversing valve movable from and to a neutral position for controlling the fluid supplied to said fluid operated means, a pair of servo control valves for controlling the pressure of the fluid operating on said device and having a casing carried on said device and forming servo valve controlled ports, and means connecting said servo valves to the reversing valve at points on opposite sides thereof when the reversing valve is in neutral.

5. A fluid operated servo control mechanism for an element movable from a neutral position to selectable forward and reverse positions, having, in combination, a fluid operated means for moving said element out of its neutral position, a fluid operated device opposing the movement of the element from its neutral position, means for supplying fluid under pressure to said fluid operated means and said device, a reversing valve movable from and to a neutral position for controlling the fluid supplied to said fluid operated means, and means for controlling the fluid acting on said device comprising a pair of servo valves, a casing movable with said device, and providing a relief passage for fluid acting on said device controlled by said servo valves, and a valve restricting the flow of fluid through said supply passage when the relief passage is open and operable when the relief passage is closed to increase the pressure of fluid on said device.

6. A fluid operated servo control mechanism for a movably mounted element having, in combination, reversing means for moving said element in opposite directions from a neutral position, a member movable in one direction from a neutral position and operable to control the position of said element on both sides of its neutral position, means forming a control piston operable to move said member towards its neutral position, means for supplying fluid under pressure continuously to said piston to urge said member toward its neutral position, and mechanism for controlling the pressure of the fluid acting on the control piston comprising a servo valve, a casing movable with said member and having a port controlled by said servo valve, a reversing valve for controlling said reversing means, and means connecting the servo valve to the reversing valve so that the servo valve operates for each direction of movement of said element.

7. A fluid operated servo control mechanism for a movably mounted element having, in combination, means for moving said element in opposite directions from a neutral position, a member movable in one direction from a neutral position and operable to control the position of said element on both sides of its neutral position, means forming a control piston operable to move said member toward its neutral position, means including a control port for maintaining fluid under pressure continuously on said piston to move said member toward its neutral position, and mechanism for controlling the pressure of the fluid acting on the control piston comprising a servo valve for controlling said port, a casing movable with said member as a unit and having said control port therein, a rotary reversing valve, and means connecting the servo valve to operate with the reversing valve.

8. A fluid operated servo control mechanism for an element movable from a neutral position to selectable forward and reverse positions, having, in combination, a fluid operated means for moving said element out of its neutral position to forward and reverse positions, a fluid operated device opposing the movement of said element from its neutral position and effective to determine the position of the element, means for supplying fluid under pressure to said fluid operated means and said device, a reversing valve movable in opposite directions from a neutral position for controlling the fluid supplied to said fluid operated means, a servo control valve means for controlling the pressure of the fluid operating on said device and including a casing movable with said device and providing a servo valve control port, and a link connecting said servo valve means to the reversing valve and in a dead center position when the reversing valve is in neutral.

9. A fluid operated servo control mechanism for an element movable from a neutral position to selectable forward and reverse positions, having, in combination, a fluid operated means for moving said element out of its neutral position to forward and reverse positions, a fluid operated device opposing the movement of the said element from its neutral position and effective to determine the position of the element, means for supplying fluid under pressure to said fluid operated means and said device, a rotary reversing valve movable in opposite directions from a neutral position for controlling the fluid supplied to said fluid operated means, a servo control valve for controlling the pressure of the fluid operating on said device and including a casing movable with said device and providing a servo valve control port, and means connecting said servo valve to operate with the reversing valve.

10. A fluid operated servo control mechanism for an element movable from a neutral position to selectable forward and reverse positions, having, in combination, a fluid operated means for moving said element out of its neutral position to forward and reverse positions, a fluid operated device opposing the movement of said element from its neutral position and effective to determine the position of the element, means for supplying fluid under pressure to said fluid operated means and said device, a rotary reversing valve movable in opposite directions from a neutral position for controlling the fluid supplied to said fluid operated means, and means for controlling the fluid acting on said device comprising a servo valve, a casing movable with said device having a relief passage for fluid acting on said device controlled by said servo valve, and a pressure operable valve restricting the flow of fluid through said supply passage when said relief passage is open and operable when said relief passage is closed to increase the pressure of fluid on said device.

11. A fluid operated servo control mechanism for a movably mounted element having, in combination, reversing means for moving said element in opposite directions, a member operable to control the position of said element, means forming a control piston operable to move said member, means for supplying fluid under pressure to said piston to move said member, mechanism for controlling the pressure of the fluid acting on the control piston comprising a servo valve and a casing for a servo valve control port carried on said member and movable therewith as a unit and a reversing valve for controlling said reversing means.

12. A fluid operated servo control mechanism for a movably mounted element having, in combination, means for moving said element in opposite directions from a neutral position, a member movable in one direction from a neutral position and operable to control the position of said element on both sides of its neutral position, means forming a control piston operable to move said member toward its neutral position, means for supplying fluid under pressure continuously to said piston to move said member toward its neutral position, and mechanism for controlling the pressure of the fluid acting on the control piston comprising a rotary servo valve having a contoured edge, a casing carried on said member and movable therewith as a unit and having a port controlled by said contoured edge, a rotary reversing valve, and means connecting the servo valve to move with the reversing valve.

13. A fluid operated servo control mechanism for a movably mounted element having, in combination, reversing means for moving said element in opposite directions from a neutral position, a member operable to control the position of said element on both sides of its neutral position, means forming a control piston operable to move said member, means including a control port for maintaining fluid under pressure continuously on said piston to move said member in a direction to move said element toward its neutral position, and mechanism for controlling the pressure of the fluid acting on the control piston comprising servo valve means, a casing carried on said member and movable therewith as a unit and having said fluid port therein and controlled by said servo valve means, and means including a reversing valve for controlling said reversing means.

14. A fluid operated servo control mechanism for a movably mounted element having, in combination, means for moving said element in opposite directions from a neutral position, a member movable in one direction from a neutral position and operable to control the position of said element on both sides of its neutral position, pressure fluid actuated means operable to move said member toward its neutral position, means for supplying fluid under pressure continuously to said fluid pressure actuated means to urge said member toward its neutral position including means forming a pair of ports movable with said member and through which the fluid flows alternately, mechanism for controlling the pressure of the fluid acting on said fluid pressure actuated means comprising a pair of servo valves each controlling one of said ports, a reversing valve for controlling said first mentioned means, and means connecting the servo valves to the reversing valve so that one servo valve operates for each direction of movement of said element.

15. A fluid operated servo control mechanism for a movably mounted element having, in combination, means for moving said element in opposite directions from a neutral position, a member movable in one direction from a neutral position and operable to control the position of said element on both sides of its neutral position, pressure fluid actuated means operable to move said member toward its neutral position, means for supplying fluid under pressure continuously to said fluid pressure actuated means to urge said member toward its neutral position including means forming a port movable with said member, mechanism for controlling the pressure of the fluid acting on said fluid pressure actuated means comprising a servo valve controlling said port, a reversing valve for controlling said first mentioned means, and means connecting the servo valve to operate with said reversing valve.

16. A fluid operated servo control mechanism for a movably mounted element having, in combination, means for moving said element in opposite directions from a neutral position, a member movable in one direction from a neutral position and operable to control the position of said element on both sides of its neutral position, pressure fluid actuated means operable to move said member toward its neutral position, means for supplying fluid under pressure continuously to said fluid pressure actuated means to urge said member toward its neutral position including means forming a port movable with said member, mechanism for controlling the pressure of the fluid acting on said fluid pressure actuated means comprising a rotary servo valve having a contoured edge controlling said port, a reversing valve for controlling said first mentioned means, and means connecting said servo valve to operate with said reversing valve.

17. A fluid operated servo control mechanism for a movably mounted element having, in combination, means for moving said element in opposite directions from a neutral position, a member movable in one direction from a neutral position and operable to control the position of said element on both sides of its neutral position, pressure fluid actuated means operable to move said member toward its neutral position, means for supplying fluid under pressure continuously to said fluid pressure actuated means to urge said member toward its neutral position including means forming a port movable with said member, mechanism for controlling the pressure of the fluid acting on said fluid pressure actuated means comprising a rotary disk-like servo valve controlling said port, said valve having an intermediate peripheral portion adapted to be disposed in controlling relation to said port when the valve is in neutral position and non-circular peripheral edges extending in either direction from the intermediate portion, a rotary reversing valve for controlling said first mentioned means, and means connecting said valves to occupy simultaneously their respective neutral positions and to move from neutral in unison.

18. A fluid operated servo control mechanism for a movably mounted element having, in combination, means for moving said element in opposite directions from a neutral position, a member movable in one direction from a neutral position and operable to control the position of said element on both sides of its neutral position, pressure fluid actuated means operable to move said member toward its neutral position, means for supplying fluid under pressure continuously to said fluid pressure actuated means to urge said member toward its neutral position, means for controlling the movement of said member by said pressure fluid actuated means comprising a servo valve having a casing movable with said member and provided with a fluid control port a portion of which extends substantially transversely to the line of movement of said member and a disk-like valve disposed at right angles to the transversely extending portion of said control port and having a non-circular peripheral edge controlling the flow of fluid through said port, and a rotary reversing valve for controlling said first mentioned means disposed transversely of the line of movement of said member and parallel with the transverse portion of said control port, said disk-like valve being connected directly to said reversing valve to be rotatable therewith.

19. A fluid operated servo control mechanism for a movably mounted element having, in combination, means for moving said element in opposite directions from a neutral position, a member movable in one direction from a neutral position and operable to control the position of said element on both sides of its neutral position, pressure fluid actuated means operable to move said member toward its neutral position, means for supplying fluid under pressure continuously to said fluid pressure actuated means to urge said member toward its neutral position, means for controlling the movement of said member by said pressure fluid actuated means comprising a servo valve having a casing movable with said member and provided with a fluid control port a portion of which extends substantially transversely to the line of movement of said member and a disk-like valve disposed at right angles to the transversely extending portion of said control port and having an intermediate peripheral portion conforming to the contour of said port and non-circular peripheral edges on either side of said intermediate portion, and a rotary reversing valve for controlling said first mentioned means disposed transversely of the line of movement of said member and parallel with the transverse portion of said control port, said disk-like valve being connected directly to said reversing valve to be rotatable therewith.

GUNNAR A. WAHLMARK.